US012663890B2

(12) United States Patent
Funabashi et al.

(10) Patent No.:   US 12,663,890 B2
(45) Date of Patent:       Jun. 23, 2026

(54) INPUT APPARATUS HAVING A TOUCH PANEL HELD BY A HOLDER MOVABLE RELATIVE TO A CIRCUIT BOARD

(71) Applicant: Alps Alpine Co., Ltd., Tokyo (JP)

(72) Inventors: Yasumasa Funabashi, Miyagi-ken (JP); Toshio Imai, Miyagi-ken (JP); Keisuke Sato, Miyagi-ken (JP); Yu Igarashi, Miyagi-ken (JP); Kiyotaka Aizawa, Miyagi-ken (JP); Yukihiro Yokoyama, Miyagi-ken (JP)

(73) Assignee: Alps Alpine Co., Ltd. (JP)

( * ) Notice:    Subject to any disclaimer, the term of this patent is extended or adjusted under 35 U.S.C. 154(b) by 0 days.

(21) Appl. No.: 18/928,353

(22) Filed:    Oct. 28, 2024

(65)              Prior Publication Data

US 2025/0053258 A1      Feb. 13, 2025

Related U.S. Application Data

(63) Continuation of application No. PCT/JP2023/008282, filed on Mar. 6, 2023.

(30)        Foreign Application Priority Data

May 18, 2022    (JP) ................................. 2022-081740

(51) Int. Cl.
     *G06F 3/041*          (2006.01)
(52) U.S. Cl.
     CPC ........ *G06F 3/0414* (2013.01); *G06F 3/04164* (2019.05)

(58) Field of Classification Search
     CPC ........................... G06F 3/0414; G06F 3/04164
     See application file for complete search history.

(56)                References Cited

U.S. PATENT DOCUMENTS

| | | |
|---|---|---|
| 2004/0200699 A1 | 10/2004 | Matsumoto et al. |
| 2014/0034472 A1 | 2/2014 | Krumpelman et al. |
| 2018/0212603 A1 | 7/2018 | Kwak |

(Continued)

FOREIGN PATENT DOCUMENTS

| | | |
|---|---|---|
| JP | H04-118826 A | 4/1992 |
| JP | 2004-327430 A | 11/2004 |
| JP | 2008-41484 A | 2/2008 |

(Continued)

*Primary Examiner* — Afroza Chowdhury
(74) *Attorney, Agent, or Firm* — Harness, Dickey & Pierce, P.L.C.

(57)                ABSTRACT

An input apparatus includes a casing having an opening on one side in a first direction, a panel at least partly exposed through the opening and configured to receive a touch operation and a pressing operation, a holder supporting the panel and reciprocating together with the panel along with the pressing operation, a board in the casing, a sensor provided on the panel and configured to detect the touch operation, a pressure detecting portion configured to detect the pressing operation, and a connector that is provided on the board and connects to a signal cable extending from the sensor. The holder includes a temporary holding portion that holds the board in a state where the board is movable at least in the first direction relative to the holder. The casing includes a stopper that comes into contact with the board from the other side in the first direction.

20 Claims, 5 Drawing Sheets

(56) References Cited

U.S. PATENT DOCUMENTS

| | | |
|---|---|---|
| 2019/0265838 A1 | 8/2019 | Kim et al. |
| 2023/0309231 A1* | 9/2023 | Bräysy .................. H05K 1/141 |

FOREIGN PATENT DOCUMENTS

| | | |
|---|---|---|
| JP | 2011-150964 A | 8/2011 |
| JP | 2012-134030 A | 7/2012 |
| JP | 2018-529178 A | 10/2018 |
| WO | 2018-105305 A1 | 6/2018 |

* cited by examiner

100

100A

120A

111

120

130

140

160

110

141

150A

113C

113

113C

113

153

150C

113B

113D

113A

131A

113B

150C

113A

151

112    131    152    150B    131    113D 150    131B    131A    130A    131B    112

INPUT APPARATUS HAVING A TOUCH PANEL HELD BY A HOLDER MOVABLE RELATIVE TO A CIRCUIT BOARD

CLAIM OF PRIORITY

This application is a Continuation of International Application No. PCT/JP2023/008282 filed on Mar. 6, 2023, which claims benefit of Japanese Patent Application No. 2022-081740 filed on May 18, 2022. The entire contents of each application noted above are hereby incorporated by reference.

BACKGROUND OF THE INVENTION

1. Field of the Invention

The present invention relates to an input apparatus and an assembly method.

2. Description of the Related Art

International Publication No. 2018/105305 discloses a configuration for a false detection prevention structure for touch sensors in which a sensor sheet connected to a touch panel is passed through a circuit board and connected to the back surface of the circuit board.

However, the assembly ease of the known input apparatus is difficult to improve because the board is fixed at a predetermined position in the casing, and then a signal cable from the sensor is connected to a connector provided on the board.

For example, the known input apparatus requires an opening at the casing for connecting the connector and an additional component to cover the opening, which may increase the number of parts and man-hours.

SUMMARY OF THE INVENTION

The present invention provides an input apparatus that includes a casing having an opening on one side in a first direction, a panel at least partly exposed through the opening, the panel being configured to receive a touch operation on an operation surface and a pressing operation toward the other side in the first direction, a holder disposed in the casing and supporting the panel, the holder reciprocating in the first direction together with the panel along with pressing operation on the panel, a board disposed in the casing, a sensor provided on the panel, the sensor being configured to detect the touch operation, a pressure detecting portion provided on the board, the pressure detecting portion being configured to detect the pressing operation, and a connector that is provided on the board and connects to a signal cable extending from the sensor, wherein the holder includes a temporary holding portion that holds the board in a state where the board is movable at least in the first direction relative to the holder, and wherein the casing includes a stopper that comes into contact with the board held by the temporary holding portion from the other side in the first direction.

An input apparatus according to one embodiment may improve the assembly ease of the input apparatus.

DESCRIPTION OF THE PREFERRED EMBODIMENTS

One embodiment will be described hereinbelow with reference to the drawings.

Configuration of Input Apparatus 100

Figure 1:
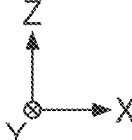
FIG. 1 is a cross-sectional view of an input apparatus according to one embodiment taken along an X-Z plane.

FIG. 1 is a cross-sectional view of an input apparatus 100 according to one embodiment taken along an X-Z plane.

In the following description, the X-axis direction is defined as the lateral direction, the Y-axis direction is defined as the front-to-back direction, and the Z-axis direction is defined as the vertical direction (an example of "first direction"), for the sake of convenience. Note that the positive direction of the X-axis is defined as the rightward direction, the positive direction of the y-axis is defined as the forward direction, and the positive direction of the Z-axis is defined as the upward direction. These describe the relative positional relationships within the apparatus and do not limit the installation or operation direction of the apparatus. Any configurations with equivalent relative positional relationships within the apparatus, including all different installation or operation directions, are included within the scope of the present invention.

The input apparatus 100 illustrated in FIG. 1 is capable of a touch operation and a pressing operation on a panel 120. For example, when a pressing operation on the panel 120 is performed, with any one of multiple symbols displayed on an operation surface 120A of the panel 120 selected via a touch operation, the input apparatus 100 may confirm the selection of the symbol.

As illustrated in FIG. 1, the input apparatus 100 includes a casing 110, a panel 120, a holder 130, a sensor 140, a signal cable 141, a board (circuit board) 150, a pressure detecting portion 151, a connector 152, a light source 153, and a light guide 160.

The casing 110 is a resin-made container-like member that houses and supports the components. The casing 110 has an opening 111 on the upper side, which is the positive side of the Z-axis (an example of "one side in a first direction").

The panel 120 is a substantially flat member made of resin. The panel 120 is at least partly exposed through the opening 111 of the casing 110. The exposed upper surface of the panel 120 serves as an operation surface 120A, on which a touch operation and a pressing operation downward, which is the negative side of the Z-axis (an example of "the other side in the first direction"), are performed by the operator.

The holder 130 is disposed inside the opening 111 in the casing 110 to support the panel 120 from below (from the negative side of the Z-axis). The holder 130 is integral with the panel 120 and reciprocates in the vertical direction (Z-axis direction) together with the panel 120 along with a pressing operation on the panel 120. More specifically, the holder 130 is supported by a guide mechanism (now shown) of the casing 110, moves downward (to the negative side of the Z-axis) while maintaining a horizontal state along the guide mechanism during a pressing operation, and returns to its initial position before the operation due to the reactive force of the pressure detecting portion 151 (described later) or similar forces when the pressing operation is completed. The holder 130 has a hollow structure, in which the sensor 140, the signal cable 141, and the light guide 160 can be disposed. The guide mechanism of the casing 110 may support the holder 130 such that the holder 130 is linearly movable in the vertical direction (Z-axis direction) while maintaining the horizontal state or such that the holder 130 is movable in the vertical direction (Z-axis direction) by the rotational motion around a pivot form (not shown).

The sensor 140 is a flat member provided on the lower surface of the panel 120 and inside the holder 130 to detect a touch operation performed on the operation surface 120A of the panel 120. This embodiment uses an electrostatic sensor that detects a touch operation through changes in capacitance as an example of the sensor 140. However, this is illustrative only. The sensor 140 may be a sensor that detects a touch operation using another method (for example, a pressure-sensitive sensor).

The signal cable 141 is a flexible belt-like member. One end of the signal cable 141 is connected to the sensor 140. The other end of the signal cable 141 is connected to the connector 152 mounted on the board 150. The signal cable 141 transmits a touch-operation detection signal output from the sensor 140 to the board 150.

The board 150 is a resin-made flat member disposed in the casing 110 in the horizontally (X-Y plane) extending state. The board 150 is held by elastic holding portions 113 and stoppers 112 provided at the casing 110 in a horizontal orientation at a predetermined height position relative to the casing 110.

The pressure detecting portion 151 is mounted on a mount surface 150A on the upper side of the board (an example of "a mount surface on one side of the board in the first direction"). The pressure detecting portion 151 detects a pressing operation performed on the operation surface 120A of the panel 120. This embodiment uses a load sensor or a push switch, as an example of the pressure detecting portion 151, that detects a pressing operation when pressed by the holder 130 which has moved downward (in the negative direction of the Z-axis) together with the panel 120. However, this is illustrative only. The pressure detecting portion 151 may be a distance sensor or similar sensors.

The connector 152 may be mounted on a mount surface 150B on the lower side of the board (an example of "a mount surface on the other side of the board in the first direction"). The connector 152 connects to the signal cable 141 extending from the sensor 140.

The light source 153 is mounted on the mount surface 150A on the upper side of the board. This embodiment uses a light emitting diode (LED) as an example of the light source 153.

The light guide 160 may be a transparent resin-made columnar member provided inside the holder 130 and held by the holder 130. The light guide 160 may be provided above the light source 153 (on the positive side of the Z-axis), the lower end surface of which faces the light source 153. This allows the light guide 160 to introduce the light emitted from the light source 153 therein through the lower end surface. The light guide 160 may propagate the light incident from the lower end surface therethrough and emit the light through the upper end surface. The upper end surface of the light guide 160 is connected to the panel 120. This allows the light exiting from the upper end surface of the light guide 160 to make a symbol or the like provided on the operation surface 120A of the panel 120 luminous.

In this embodiment, the holder 130 holds the light guide 160, and the light source 153 is disposed on the position on the upper surface of the board 150 facing the light guide 160, allowing the components to be disposed with high space utilization.

Figure 3A:
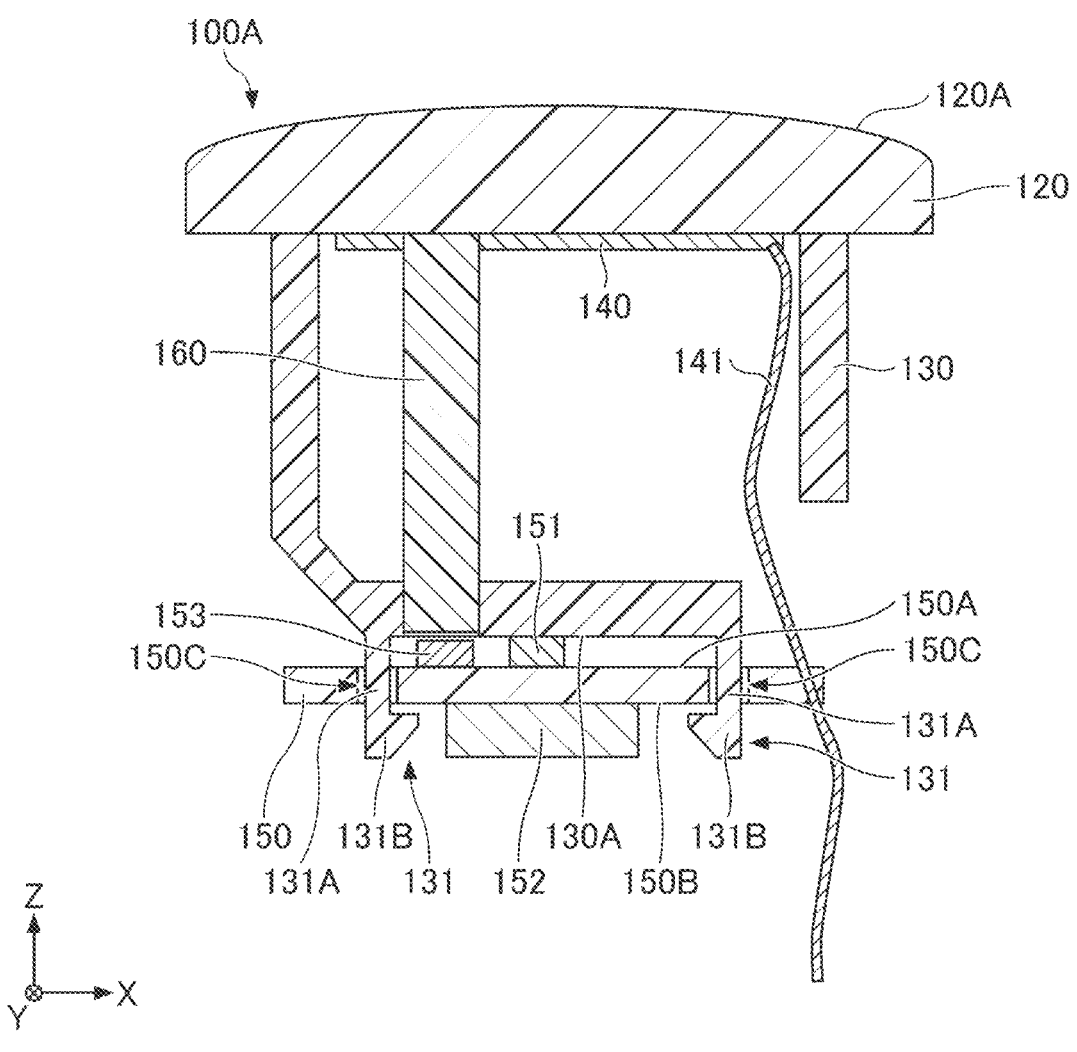
FIG. 3A is a diagram for illustrating an example of the procedure of the assembly method for the input apparatus according to one embodiment.

As illustrated in FIG. 1, in the input apparatus 100, a unit 100A is formed by integrating the plurality of members excluding the casing 110 (that is, the panel 120, the holder 130, the sensor 140, the signal cable 141, the board 150, the pressure detecting portion 151, the connector 152, the light source 153, and the light guide 160) (see FIG. 3A).

The holder 130 includes temporary holding portions 131 that hold the board 150 in a state where the board 150 can be moved relative to the holder 130 at least in the vertical direction (Z-axis direction). For example, in this embodiment, the temporary holding portions 131 extend downward (in the negative direction of the Z-axis) from the lower surface 130A of the bottom plate of the holder 130. Each of the temporary holding portions 131 may be shaped like a hook having a catch 131B at the end of each of a pair of arms 131A and passes through a through-hole 150C of the board 150. The length from the lower surface 130A of the bottom plate of the holder 130 to the catches 131B of the temporary holding portions 131 is larger than the thickness of the board 150. This allows the board 150 to move relative to the holder 130 in the vertical direction (Z-axis direction) by the amount corresponding to the difference. For this reason, with the holder 130 and the board 150 joined to the casing 110, when a pressing operation is performed on the panel 120, the holder 130 approaches relative to the board 150 with its vertical (Z-axis) position defined by the stoppers 112 of the casing 110 (described below) to push the pressure detecting portion 151 of the board 150, allowing for reliably detecting the pressing operation.

Furthermore, each through-hole 150C is sized such that the catch 131B does not fall out, while leaving a gap from the arm 131A. This configuration allows the board 150 to move relative to the holder 130 in the lateral direction (X-axis and Y-axis directions) by the amount corresponding to the gap. This allows, with the holder 130 and the board 150 joined to the casing 110, the position of the holder 130 relative to the casing 110 in the lateral direction (X-axis and Y-axis directions) and the position of the board 150 relative to the casing 110 in the lateral direction (X-axis and Y-axis directions) to be separately determined by the guide mechanism of the casing 110 (not shown) without the holder 130 and the board 150 being influenced by each other. Although this embodiment includes the pair of (two) arms 131A, this is illustrative only. Only one arm 131A may be provided on one side, or three or more arms 131A may be provided.

The casing 110 includes the pair of stoppers 112, which comes into contact with the mount surface 150B on the lower side of the board 150 held by the temporary holding portions 131 of the holder 130 from below ("the other side in the first direction"). The casing 110 defines the vertical (Z-axis) position of the board 150 relative to the casing 110 using the stoppers 112. Thus, the vertical (Z-axis) position of the pressure detecting portion 151 mounted on the mount surface 150A on the upper side of the board is also defined. This allows the input apparatus 100 to accurately detect the pressing operation when the pressure detecting portion 151 is pushed by the holder 130. Although this embodiment includes the pair of (two) stoppers 112, only one stopper 112 may be provided on one side, or three or more stoppers 112 may be provided.

The casing 110 may include the pair of elastic holding portions 113 that holds the board 150 by snapping-in from above (one side in the first direction). In particular, in this embodiment, the elastic holding portions 113 have a hook shape including the arms 113A that are elastically deformable in the lateral direction (X-axis direction) (an example of "a direction perpendicular to the first direction") and engaging portions 113B provided at the upper end ("one side in the first direction") and engaging with the board 150. Although this embodiment includes the pair of (two) elastic holding portions 113, only one elastic holding portion 113 may be provided on one side, or three or more elastic holding portions 113 may be provided.

The engaging portions 113B of the elastic holding portions 113 may each have, on the upper side ("one side in the first direction"), a guide surface 113C inclined outward from the casing 110 with respect to the vertical direction (Z-axis direction).

The engaging portions 113B of the elastic holding portions 113 may each have, on the lower side ("the other side in the first direction"), an urging surface 113D which is inclined with respect to the board extending direction (X-Y plane) to come into contact with the edge of the mount surface 150A on the upper side of the board ("the surface of the board on one side in the first direction").

Assembly Method for Input Apparatus 100

Figure 2:
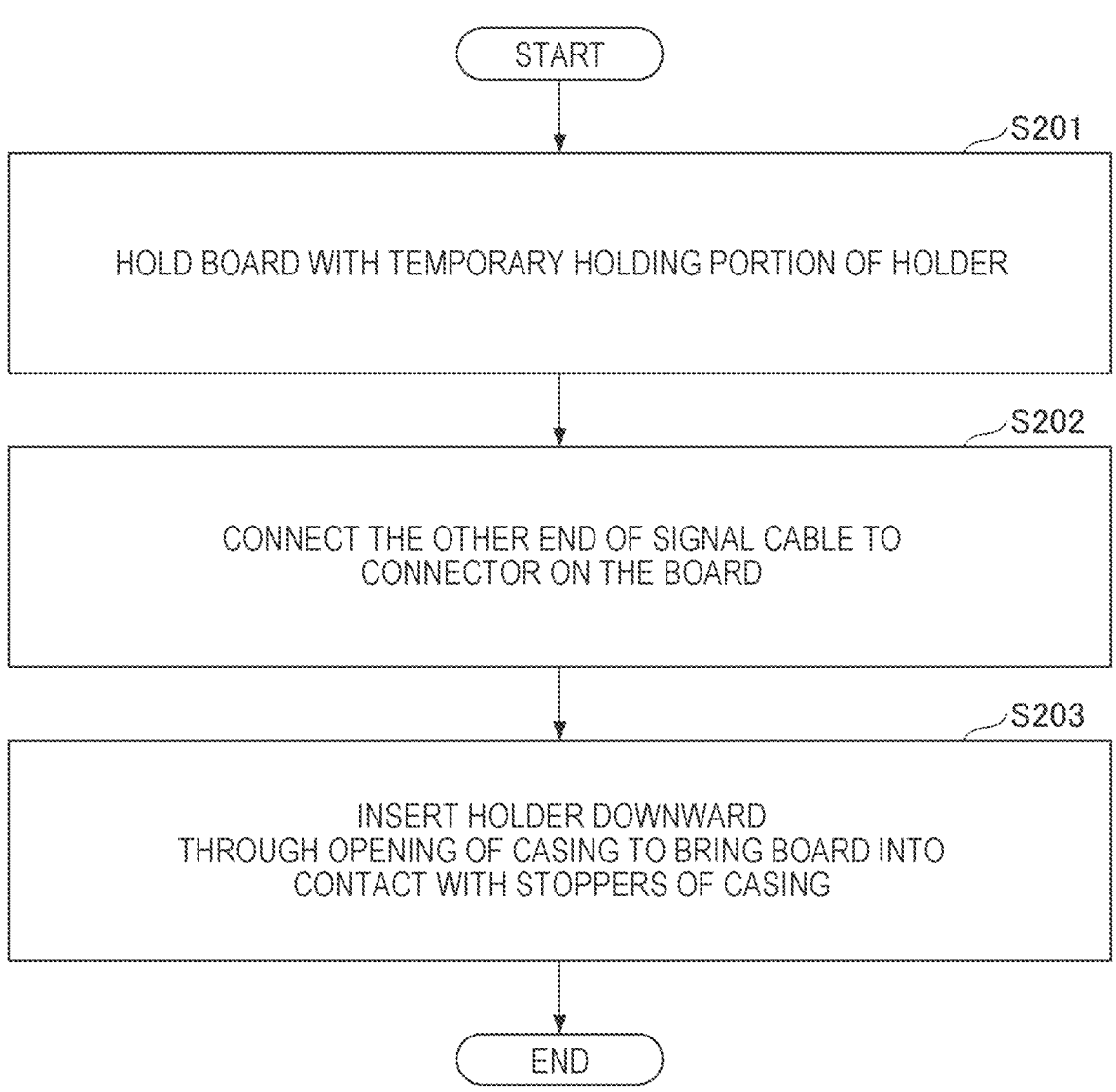
FIG. 2 is a flowchart illustrating an example of the procedure of an assembly method for the input apparatus according to one embodiment.
Figure 3B:
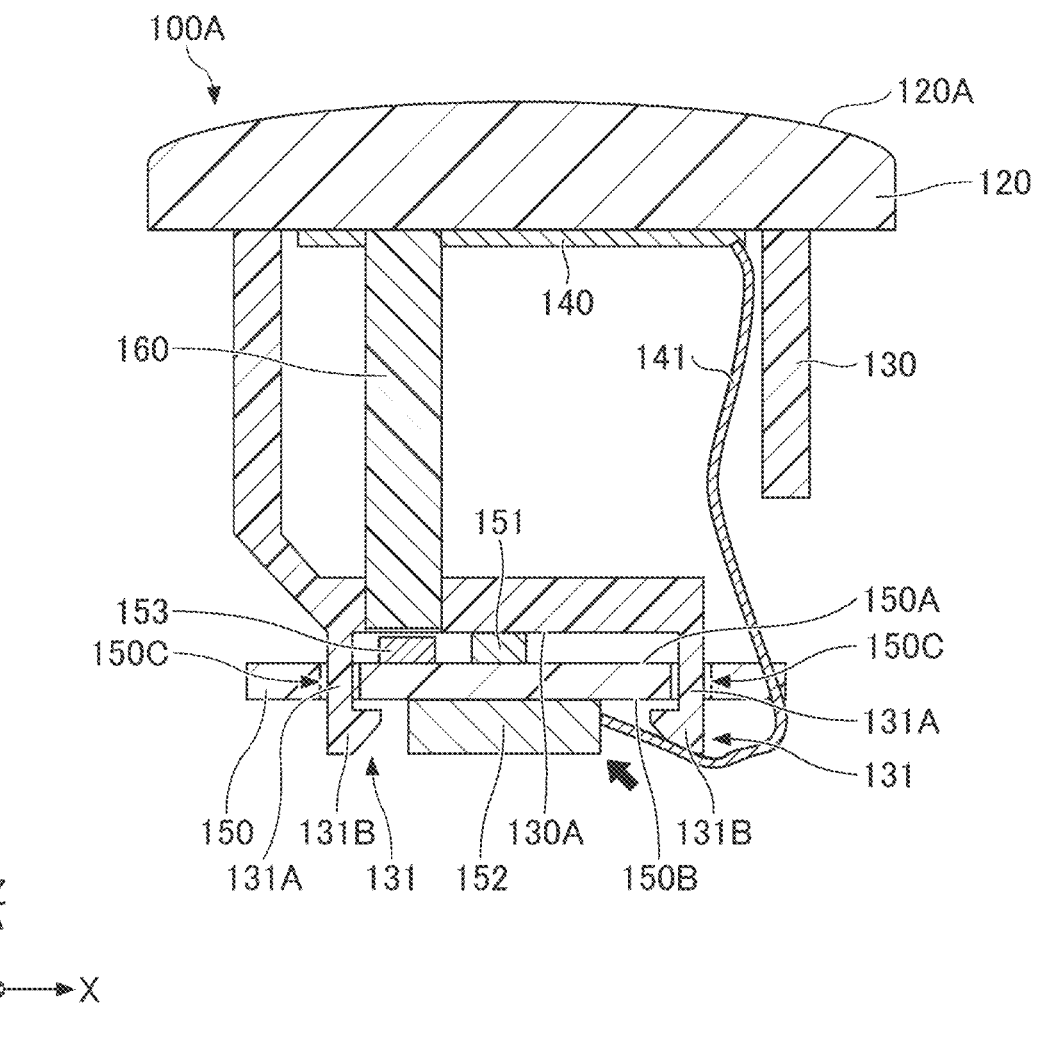
FIG. 3B is a diagram for illustrating an example of the procedure of the assembly method for the input apparatus according to one embodiment.
Figure 3C:
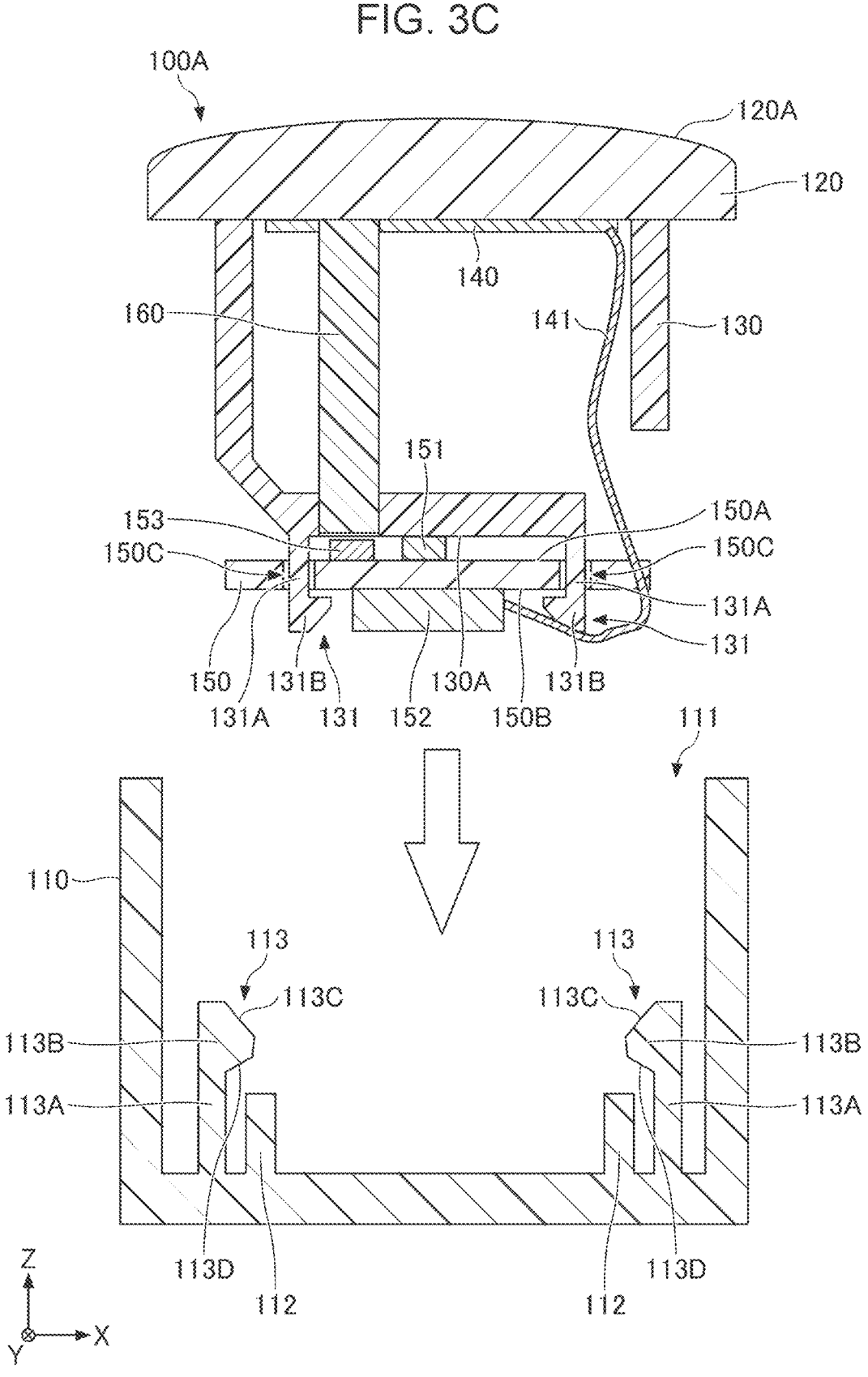
FIG. 3C is a diagram for illustrating an example of the procedure of the assembly method for the input apparatus according to one embodiment.

An assembly method for the input apparatus 100 according to one embodiment will be described hereinbelow. FIG. 2 is a flowchart illustrating an example of the procedure of an assembly method for the input apparatus 100 according to one embodiment. FIGS. 3A to 3C are diagrams for illustrating an example of the procedure of an assembly method for the input apparatus 100 according to one embodiment.

Step S201: First Process

First, as illustrated in FIG. 3A, the assembly worker passes the arms 131A and the catches 131B of the temporary holding portions 131 through the through-hole 150C of the board 150 to hold the board 150 with the temporary holding portions 131 of the holder 130.

Here, in the input apparatus 100 according to one embodiment, the temporary holding portions 131 of the holder 130 can hold the board 150 in such a manner that the board 150 is movable in the vertical direction (Z-axis direction) relative to the holder 130. Furthermore, the temporary holding portions 131 of the holder 130 can hold the board 150 in such a manner that the board 150 is movable in the lateral direction (X-axis and Y-axis directions) relative to the holder 130.

Step S202: Second Process

Next, as illustrated in FIG. 3B, the assembly worker inserts the other end of the signal cable 141 into the connector 152 provided on the lower mount surface 150B of the board 150 to connect them. Thus, the assembly of the unit 100A is completed.

In the input apparatus 100 according to one embodiment, since the board 150 can be held by the temporary holding portions 131 of the holder 130, as described above, the operation for connecting the signal cable 141 to the connector 152 can easily be performed, with the connector 152 located outside the casing 110. Furthermore, the input apparatus 100 according to one embodiment does not require an opening for connecting the connector 152 to the casing 110 and also a member for closing the opening, thereby reducing the number of parts and man-hours.

In the input apparatus 100 according to one embodiment, since the connector 152 is provided on the lower mount surface 150B of the board 150, the signal cable 141 can easily be connected to the connector 152, and a sufficient installation space for other components on the upper mount surface 150A of the board 150 can be provided.

Step S203: Third Process

Next, as illustrated in FIG. 3C, the assembly worker inserts the unit 100A that has been assembled in step S202 downward (an example of "the other side in the first direction") through the opening 111 of the casing 110, with the board 150 held by the holder 130 with the temporary holding portions 131, to bring the board 150 into contact with the stoppers 112 of the casing 110. At that time, the elastic holding portions 113 of the casing 110 are elastically deformed outward when snapped in from above (one side in the first direction), then return to their original state to hold the board 150. Thus, the assembly of the input apparatus 100 is completed, and the input apparatus 100 enters the completed state illustrated in FIG. 1.

In the input apparatus 100 according to one embodiment, the board 150 is fixed in the completed state illustrated in FIG. 1. However, the holder 130 is movable in the vertical direction (Z-axis direction) relative to the board 150. For this reason, in the input apparatus 100 according to one embodiment, the panel 120 and the holder 130 move downward (in the negative direction of the Z-axis) in an integrated manner when a pressing operation is performed on the operation surface 120A of the panel 120, and the holder 130 pushes the pressure detecting portion 151, and the pressing operation can be detected.

Here, in the input apparatus 100 according to one embodiment, the board 150 can be held by the temporary holding portions 131 of the holder 130, the holder 130 and the board 150 can be collectively installed into the casing 110 only by inserting the holder 130 through the opening 111.

In the input apparatus 100 according to one embodiment, the casing 110 includes the stoppers 112 that come into contact with the board 150 held by the temporary holding portions 131 of the holder 130 from below. This configuration allows the input apparatus 100 according to one embodiment to easily place the board 150 at a predetermined height position by a simple push operation from above.

Thus, according to the input apparatus 100 according to one embodiment, the assembly ease of the input apparatus 100 can be improved.

Furthermore, in the input apparatus 100 according to one embodiment, since the elastic holding portions 113 of the casing 110 can hold the board 150 by snapping-in from above, the board 150 which is in contact with the stoppers 112 can easily be held, and fixing members (screws, etc.) for fixing the board 150 are not required, thereby reducing the number of parts and man-hours.

In the input apparatus 100 according to one embodiment, since the elastic holding portions 113 of the casing 110 have a hook shape including the arm 113A and the engaging portion 113B, the board 150 can easily be held by snapping-in through a simple push operation from above.

The elastic holding portions 113 may have any shape capable of holding the board 150 by snapping-in from above (for example, the elastically deformable arms 113A each have a hole, into which a protrusion provided at the board 150 fits).

In the input apparatus 100 according to one embodiment, the engaging portions 113B of the elastic holding portions 113 each have the guide surface 113C, at the top, that is inclined with respect to the vertical direction (Z-axis direction). This allows the input apparatus 100 according to one embodiment to easily expand the elastic holding portions 113 outward by bringing the edge of the lower mount surface 150B of the board 150 into contact with the guide surfaces 113C and to make the board 150 stride over the engaging portions 113B to locate under the engaging portions 113B.

In the input apparatus 100 according to one embodiment, the engaging portions 113B of the elastic holding portions 113 each have, on the lower side, the urging surface 113D that is inclined with respect to the vertical direction (Z-axis direction) to come into contact with the board 150. This allows the input apparatus 100 according to one embodiment to urge the edge of the upper mount surface 150A of the board 150 downward to push the board 150 against the stoppers 112 while absorbing manufacturing tolerances in the lateral width and thickness of the board 150 through the urging surface 113D. This allows the input apparatus 100 according to one embodiment to stably hold the board 150 at a predetermined height position without generating a wobble.

In the input apparatus 100 according to one embodiment, since the board 150 can be stably held at a predetermined height position, a pressing operation on the operation surface 120A of the panel 120 can be reliably detected by the pressure detecting portion 151 provided on the upper surface of the board 150. Furthermore, in the input apparatus 100 according to one embodiment, the urging surfaces 113D are inclined with respect to the vertical direction (Z-axis direction). This allows the board 150 to expand the elastic holding portions 113 outward only by drawing the unit 100A upward also during disassembly, thereby easily separating the board 150 from the elastic holding portions 113.

Having described one embodiment of the present invention in detail above, it is to be understood that the present invention is not limited to the embodiment and that various modifications and changes may be made within the spirit and scope of the present invention as hereinafter claimed.

What is claimed is:

1. An input apparatus comprising:
a casing having an opening on one side in a first direction and a stopper, the stopper having a first part and a second part different from the first part, the first part of the stopper being located at an inner surface of the casing;
a panel at least partly exposed through the opening, the panel being configured to receive a touch operation on an operation surface and a pressing operation toward the other side in the first direction;
a holder disposed in the casing and supporting the panel, the holder reciprocating in the first direction together with the panel along with the pressing operation on the panel;
a circuit board disposed in the casing;
a sensor provided on the panel, the sensor being configured to detect the touch operation;
a pressure detecting portion provided on the circuit board, the pressure detecting portion being configured to detect the pressing operation; and
a connector that is provided on the circuit board and connects to a signal cable extending from the sensor,
wherein the holder includes a temporary holding portion that holds the circuit board in a state where the circuit board is movable at least in the first direction relative to the holder, and

the second part of the stopper abuts the circuit board held by the temporary holding portion from the other side in the first direction.

2. The input apparatus according to claim 1, wherein the casing includes an elastic holding portion that holds the circuit board by snapping-in from the one side in the first direction.

3. The input apparatus according to claim 2, wherein the elastic holding portion is hook-shaped, and the elastic holding portion is configured with an arm and an engaging portion,
the arm is elastically deformable in a direction perpendicular to the first direction, and
the engaging portion is provided at an end of the arm on the one side in the first direction and engages with the circuit board.

4. The input apparatus according to claim 3, wherein the engaging portion of the elastic holding portion has, at the one side in the first direction, a guide surface inclined with respect to the first direction.

5. The input apparatus according to claim 3, wherein the engaging portion of the elastic holding portion has, at the other side in the first direction, an urging surface that is inclined with respect to an extending direction of the circuit board to abuts the circuit board.

6. The input apparatus according to claim 1, wherein the connector is provided on a first mount surface of the circuit board on the other side in the first direction.

7. The input apparatus according to claim 1,
wherein the holder holds a light guide, and
a light source is provided, at a position facing the light guide, on a second mount surface of the circuit board on the one side in the first direction.

8. The input apparatus according to claim 1, wherein the sensor is an electrostatic sensor.

9. The input apparatus according to claim 1, wherein the pressure detecting portion is a load sensor.

10. The input apparatus according to claim 1, wherein the pressure detecting portion is a distance sensor.

11. The input apparatus according to claim 1, wherein the pressure detecting portion is a push switch.

12. An assembly method for the input apparatus according to claim 1, the assembly method comprising:
a first process for holding the circuit board with the temporary holding portion of the holder;
a second process for connecting the signal cable to the connector on the circuit board; and
a third process for inserting the holder that holds the circuit board with the temporary holding portion toward the other side in the first direction through the opening of the casing to bring the circuit board into contact with the stopper of the casing.

13. The input apparatus according to claim 1, wherein the stopper continuously extends from the inner surface of the casing.

14. An input apparatus comprising:
a casing having an opening on one side in a first direction and a stopper, the stopper having a first part and a second part different from the first part, the first part of the stopper being located at an inner surface of the casing;
a panel at least partly exposed through the opening, the panel being configured to receive a touch operation on an operation surface and a pressing operation toward the other side in the first direction;

a holder disposed in the casing and supporting the panel, the holder reciprocating in the first direction together with the panel along with the pressing operation on the panel;

a circuit board disposed in the casing;

a sensor provided on the panel, the sensor being configured to detect the touch operation; and a connector that is provided on the circuit board and connects to a signal cable extending from the sensor, wherein the holder includes a temporary holding portion that holds the circuit board in a state where the circuit board is movable at least in the first direction relative to the holder, and the second part of the stopper abuts the circuit board held by the temporary holding portion from the other side in the first direction.

15. The input apparatus according to claim 14, wherein the casing includes an elastic holding portion that holds the circuit board by snapping-in from the one side in the first direction.

16. The input apparatus according to claim 15, wherein the elastic holding portion is hook-shaped, and the elastic holding portion is configured with an arm and an engaging portion, the arm is elastically deformable in a direction perpendicular to the first direction, and the engaging portion is provided at an end of the arm on the one side in the first direction and engages with the circuit board.

17. The input apparatus according to claim 14, wherein the connector is provided on a first mount surface of the circuit board on the other side in the first direction.

18. The input apparatus according to claim 14, wherein the holder holds a light guide, and a light source is provided, at a position facing the light guide, on a second mount surface of the circuit board on the one side in the first direction.

19. The input apparatus according to claim 14, wherein the sensor is an electrostatic sensor.

20. An assembly method for the input apparatus according to claim 14, the assembly method comprising:

a first process for holding the circuit board with the temporary holding portion of the holder;

a second process for connecting the signal cable to the connector on the circuit board; and a third process for inserting the holder that holds the circuit board with the temporary holding portion toward the other side in the first direction through the opening of the casing to bring the circuit board into contact with the stopper of the casing.

* * * * *